Aug. 24, 1937.  H. W. OLIVER  2,090,805
BICYCLE STOP SIGNAL
Filed Nov. 6, 1936  2 Sheets-Sheet 1

Inventor
H. W. Oliver

By Clarence A. O'Brien
Hyman Berman
Attorney

Aug. 24, 1937.  H. W. OLIVER  2,090,805
BICYCLE STOP SIGNAL
Filed Nov. 6, 1936  2 Sheets-Sheet 2
Fig. 2.
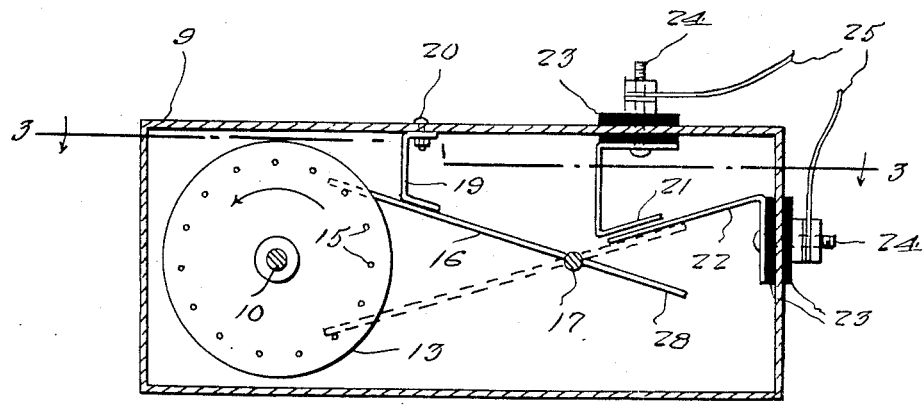
Fig. 3.
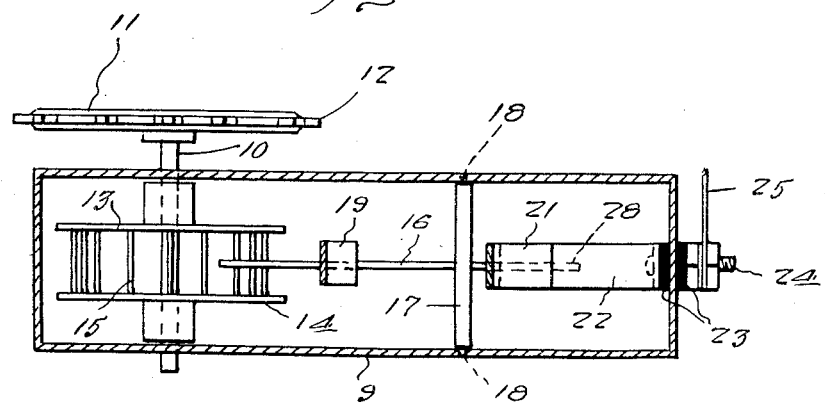
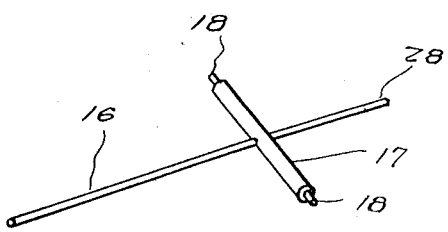
Fig. 5.
Inventor
H. W. Oliver
By Clarence A. O'Brien
Hyman Berman
Attorneys Patented Aug. 24, 1937

2,090,805

UNITED STATES PATENT OFFICE 2,090,805

BICYCLE STOP SIGNAL

Howard W. Oliver, Alexandria, Ind.

Application November 6, 1936, Serial No. 109,582

3 Claims. (Cl. 200—52)

This invention relates to a stop signal for bicycles and has for its principal object to provide means for flashing a stop signal automatically with the application of the vehicle brake.

Further and additional objects are to provide a bicycle stop signal mechanism which is of simple and inexpensive construction design and which can be easily attached to a bicycle frame and which embodies, also, a novel circuit controller or switch mechanism operated by the energy of the vehicle.

With the above objects in view, the invention consists of the novel construction, arrangement and combination of parts hereinafter more fully described and pointed out with reference to the accompanying drawings, wherein:—

Fig. 2 is a sectional view on an enlarged scale of the switch unit.

Fig. 3 is a section on line 3—3 of Fig. 2, and

Fig. 5 is a perspective view of a switch actuator rod.

Figure 1:
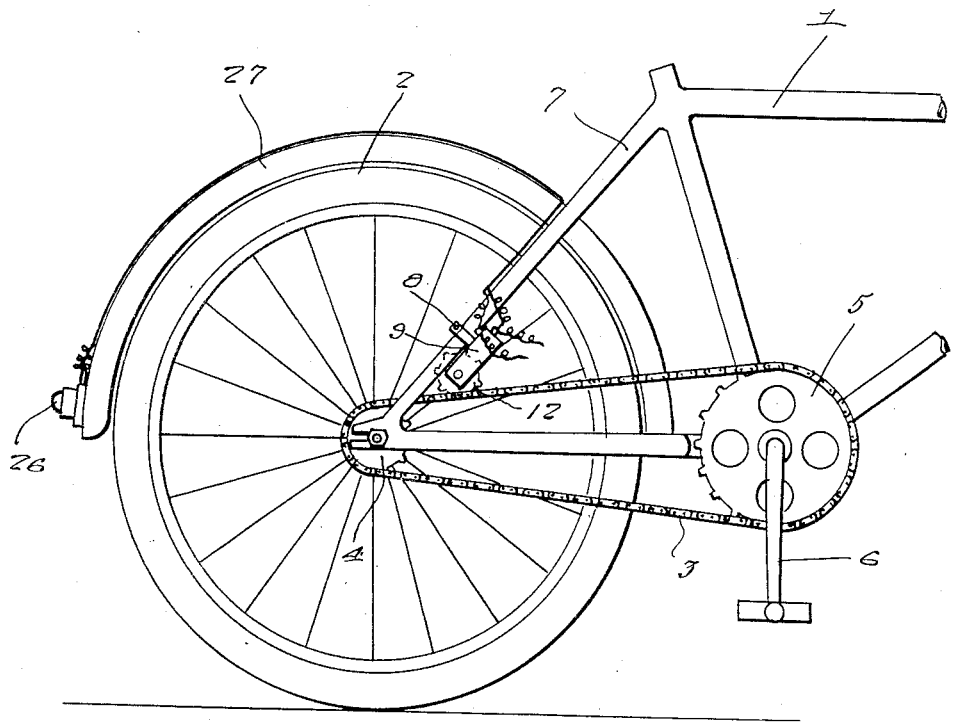
Figure 1 is a view disclosing the rear wheel assembly of a bicycle with the invention applied thereto.
Figure 4:
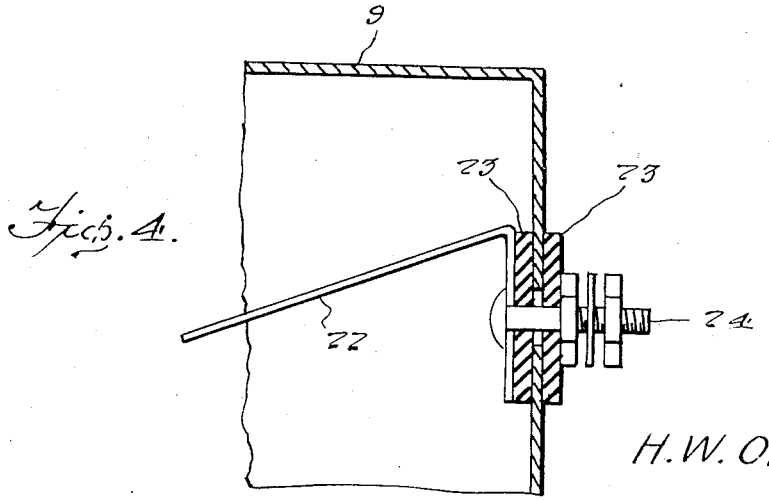
Fig. 4 is a detail sectional view of a portion of the switch casing and one of the contact elements, the latter being in section to illustrate the manner of mounting the contact.

The bicycle construction shown in Fig. 1 is conventional and consists of the frame 1 at the rear end of which is the usual rubber tired wheel 2; the latter being rotated by sprocket chain 3 passing around wheel sprockets 4 and driving sprocket 5, the latter being rotated by means of pedals 6. To the rear frame member 7 is attached, by suitable clamping means 8, a small metallic box or casing 9 enclosing the switch mechanism of the invention. This switch mechanism is shown in detail in Fig. 2, and includes a short axle 10 journalled crosswise of the casing 9 with a small cog wheel or gear 11 fixedly mounted on one end thereof and exteriorly of the casing with the teeth thereof disposed in meshing relation with the link of the sprocket chain 3. The casing is fixed to the bicycle frame so that the gear is engaged with and rotated by the upper links of the chain in an anticlockwise direction, when the bicycle is being propelled forwardly.

Enclosed in casing 9 and fixed on axle 10 so as to turn therewith is a wheel composed of relatively spaced disks 13 and 14 connected together by a plurality of cross pins 15 extending circumferentially of the disks in relatively spaced relation adjacent the outer peripheral edges of the disks. Extending into the space between a pair of cross pins 15 is one end of a switch actuator rod 16; the latter having an integrally formed pivot pin 17 extending crosswise thereof adjacent its opposite end and terminating in trunnions 18 journalled in suitable apertures in the side walls of casings 9 in alinement with the axis 10 of the ratchet wheels and suitably spaced therefrom so that the wheel engaging end of the rod is clear of the axle 10 when moving from one end to the other of its arcuate path during the rotation or oscillation of the rod. When the ratchet wheel is rotating in the direction indicated by the arrow in Fig. 2, the rod 16 is disposed in the position indicated in full lines, being maintained in contact with the teeth or pins 15 of the wheel, by a spring stop 19 suitably fastened to the casing as shown at 20.

Fixed to the casing 9 adjacent the opposite end of rod 16 are spring contact fingers 21 and 22. These contacts are arranged with relatively overlapping ends normally held apart by the inherent resiliency of the contact fingers. These contact fingers are suitably insulated from the casing by fiber washers 23 and have binding posts 24 to which are connected the conductors 25 connected in electrical circuit with an electric lamp 26 which, for the purposes of the present invention, is preferably mounted at the rear lower end of the rear wheel fender 27, as shown in Fig. 1. The lamp 26 may be colored red to flash a stop signal when illuminated. Contact finger 22 is so disposed in casing 9 as to have its free end disposed in the path travelled by the free end 28 of rod 16, whereby said end of the rod will press against the contact finger 22 to move the latter in contact with spring contact fingers 21, thereby closing the circuit to the lamp. This action occurs only when the rod 16 is moved from its full line position by the reverse turning of the ratchet wheels.

In the operation of the device, when the bicycle is being propelled forwardly, the anticlockwise rotation of the ratchet wheel merely causes the rod 16 to be disposed against the spring stop 19 by reason of the pins 15 contacting successively therewith. In this position of the rod, the end 28 thereof is remote from spring contact 22 and hence the signal circuit remains open and no signal is flashed. However, when the wheel brake is applied to bring the bicycle to a stop, this is usually done by a reverse movement of the pedals and the resultant reverse rotation of the sprocket chain causes the ratchet wheel to rotate in a clockwise direction, and to swing rod 16 about its axis in such a manner that the end 28 thereof presses against contact finger 22, moving the latter into engagement with contact finger 21 and, thereby, closing the signal circuit and flashing a stop signal by lighting lamp 26.

Having thus described the invention, what is claimed is:—

1. A bicycle switch comprising a switch casing adapted to be attached to a frame member of the bicycle, a pair of normally spaced apart contact members in said casing, an axle journaled crosswise of the casing and provided externally of the casing with a wheel adapted to be operatively connected with the propelling mechanism of the bicycle to be rotated thereby and provided internally of the casing with a ratchet wheel, and a switch actuator rod between the ratchet wheel and the contact members and mounted for movement about an axis with one end thereof engaging the teeth of the ratchet wheel to be moved about its axis in one direction of rotation of the ratchet wheel for disposing its other end in abutment with one of the contact members to move the latter in engagement with the other contact member and to be moved about its axis in the opposite direction of rotation of the ratchet wheel for placing its other end remote from said contact members.

2. A bicycle switch for a chain propelled bicycle comprising a switch casing adapted to be attached to a frame member of the bicycle in proximity to the upper links of the bicycle chain, a pair of normally spaced apart circuit controlling contacts in said casing, a member pivotally mounted in said casing for movement against said contacts to place them in circuit closing position, and a cog wheel mounted externally of the said casing to be engaged with and rotated by the said upper links of the bicycle chain and being operatively connected with said member to move it against the contacts in one direction of movement only of the chain.

3. A switch comprising a casing, a shaft journaled crosswise of the casing, a driving member fixedly mounted on the shaft exteriorly of the casing for communicating rotary motion thereto from a suitable source, a ratchet wheel fixed on said shaft internally of said casing and composed of relatively spaced disks connected by a plurality of cross-pins extending circumferentially of the disks in relatively spaced relation adjacent the outer peripheral edges of the disks, a switch actuator rod pivotally mounted in said casing for movement about an axis parallel to the axis of the ratchet wheel, said rod having one end thereof extending into the space between a pair of said cross-pins and having its axis suitably spaced from the axis of the ratchet wheel so that the wheel engaging end of the rod is clear of the said shaft when moving from one end to the other of an arcuate path, a pair of spring contact fingers within and fixed to the casing adjacent the opposite end of the said rod and having relatively overlapping ends normally spaced apart, one of said contact fingers being disposed in the path traveled by the said opposite end of the rod whereby said end of the rod will press against the said finger to move the latter in contact with the other contact finger in one direction of rotation of the ratchet wheel.

HOWARD W. OLIVER.